(12) United States Patent
Olsson et al.

(10) Patent No.: US 8,334,622 B2
(45) Date of Patent: Dec. 18, 2012

(54) EMERGENCY STOP SYSTEM FOR A GROUP OF MACHINE UNITS

(76) Inventors: Jan-Erik Ronny Olsson, Vrigstad (SE); Nils Peter Wilhelm Berg, Björköby (SE)

( * ) Notice: Subject to any disclaimer, the term of this patent is extended or adjusted under 35 U.S.C. 154(b) by 1084 days.

(21) Appl. No.: 10/599,253

(22) PCT Filed: Mar. 19, 2005

(86) PCT No.: PCT/SE2005/000407
§ 371 (c)(1),
(2), (4) Date: Aug. 11, 2009

(87) PCT Pub. No.: WO2005/091523
PCT Pub. Date: Sep. 29, 2005

(65) Prior Publication Data
US 2009/0308708 A1 Dec. 17, 2009

(30) Foreign Application Priority Data

Mar. 22, 2004 (SE) .................................. 0400768
Mar. 19, 2005 (EP) .................................. 05722249

(51) Int. Cl.
*H02H 11/00* (2006.01)

(52) U.S. Cl. ........................................... 307/326
(58) Field of Classification Search .................. 307/326
See application file for complete search history.

(56) References Cited

U.S. PATENT DOCUMENTS

2005/0055130 A1* 3/2005 Carlson et al. ............... 700/245

* cited by examiner

*Primary Examiner* — Robert L. Deberadinis

(57) ABSTRACT

An emergency stop system for a group of machine units (1), driven by energy from a source (2) is disclosed. The machine units are provided with a cut off means (3) for the energy feed, that can be acted upon via a receiver (5) by a transmitted signal, with a radio frequency, from a transmitter in a group of mobile units (7), provided with such, carried by one or several operators.

Primarily the emergency stop system is characterized in that every machine unit (1) is provided with a communication unit (4) in the form of a transmitter/receiver (5) for radio-resp. IR-frequency in contact with a computer unit (6). Each mobile unit (7) in provided with a transmitter/receiver for radio-resp. IR-frequency for identifying and authorizing communication. The cut off means (3) is provided not to be activated or inactivated without foregoing identifying and authorizing IB-communication.

6 Claims, 1 Drawing Sheet

_US 8,334,622 B2_

EMERGENCY STOP SYSTEM FOR A GROUP OF MACHINE UNITS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATIO-BY-REFERENCE OF MATERIAL SUBMITTED ON A COMPACT DISC

Not Applicable

TECHNICAL FIELD

The present invention relates to an emergency stop system for a group of machine unity, driven by energy from a source such as an electrical net, medium under pressure etc, whereas each of the machine units is provided with a cut off means for the energy feed, acted upon via a receiver by a transmitted signal, with a radio frequency, from a transmitter in a group of mobile units, provided with such, carried by one or several operators.

The invention also relates to an emergency stop system for one machine unit.

BACKGROUND ART

From GB 2 198 614 A an emergency stop system is know since long. In this publication there is disclosed an emergency stop system comprising a cut off means in the form of a primary control element, provided for instance to open a circuit breaker in the energy feed to a machine or to close a valve as a response to a remotely transmitted radio-sound- or ultrasound signal. Each operator carries a transmitter for transmitting this signal, such that the operator continuously is ready to rut off the energy feed in case of threatening situation or accident. There arc further suggestions for designing emergency stop systems, especially for designing said transmitter. Emergency stop systems hitherto known lack authority identification and authorization. This means, that the machines may be started even if no mobile units are in operation.

From US 2005/0055130 a communication system for wireless control is also known. In this, publication there is disclosed a portable operating unit and control unit. The portable operating units main purpose is to provide control of a machine but also execute an emergency stop on command or when the wireless communication is broken. This publication does not disclose or suggest, inter alia, driving means is provided not to be activated or inactivated without foregoing identifying and authorizing of the operator by IR-communication with the operators personal mobile control unit. This publication does also not disclose or suggest, inter alia, the application of such to be operated by several operators each carrying a device capable of wirelessly putting the machine unit into a safe state. This publication does also not disclose or suggest, inter alia, the operating unit to be able to control several machine units.

BRIEF SUMMARY OF THE INVENTION

The object of the present invention is to create an emergency stop system of the art mentioned under "TECHNICAL FIELD", admitting safe identifying and authorization of operators. Firstly such one is characterized in that every machine unit is provided with a communication unit comprising an IR-transmitter/receiver in contact with a computer unit and each mobile unit is provided with an IR-transmitter/receiver for identifying and authorizing communication, whereas the cut off means is provided not to be activated or inactivated without foregoing identifying and authorizing IR-communication.

In one preferred embodiment the communication is arranged to continually warrant the radio communication with the identified and authorized mobile unit, whereas it is provided to emit alarm, preferably optically or acoustically when the communication is interrupted.

In one suitable embodiment, the mobile unit is provided with a display, arranged to show the status for the communications with the communications unit.

BRIEF DESCRIPTION OF THE DRAWINGS

Other features and advantages or the present invention will become more apparent to a person skilled in the art from the following detailed description in conjunction with the appended drawings in which.

DETAILED DESCRIPTION OF THE INVENTION

Figure 2:
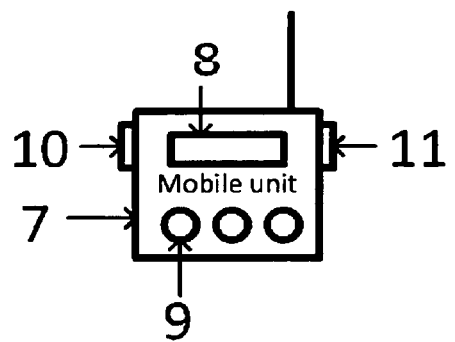
FIG. 2 shows a mobile unit.
Figure 1:
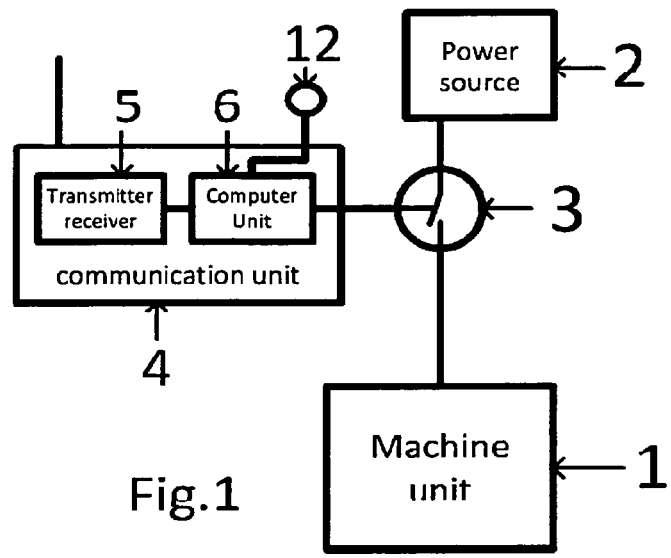
FIG. 1 shows a machine unit, connected to a source of energy, with a communication unit; whilst

In FIG. 1 a machine unit is marked by 1, a source of energy connected to it, by 2. The feed of energy to the machine unit may be cut off by a cut off means 3. A communication unit 4 is provided connected to the machine unit. It comprises a transmitter/receiver 5 for radio-resp. IR-frequency connected to a computer unit 6. In FIG. 2 there is shown a mobile unit 7, also provided with a transmitter/receiver for radio-resp. IR-frequency. Radio frequency in this context for example means 433,92 MHz, whilst IR-frequency means infrared light of a frequency, that is achieved by conventional devices. The mobile unit 7 is provided with a display 8, showing the status for the communication at radio frequency between the communication unit 4 and the mobile unit 7. This is equipped with a number of push buttons 9 for the communication with the communication unit and two buttons 10, 11 for mutual emitting a signal for cutting off by the cutting off means 3. The computer unit 6 is also connected to an alarm 12, the function of which shall be described below.

The requisite for starting a machine unit is that at least one operator has performed a coupling, that is to say, has established a radio contact with the machine unit in question. This is achieved in that the operator places himself relatively close to the machine unit in question and emits an IR-signal by pushing a button 9 at the mobile unit 7. Then the communication unit releases a signal to the mobile unit asking for the identity of same. Identity in this context means the personal data of one or several operators. Hereby the identity of one or several operators may be identified and authorised for the communication with one machine unit. At the display of the mobile unit the status of the communication may be read.

Control of the communication can be performed continually between a coupled mobile unit and a communication unit. If the communication should be broken the computer unit 6 will release an alarm to the alarm unit 12, which alarm may be optical and/or acoustical.

The invention claimed is:

1. An emergency stop system for a group of machine units (1), driven by energy from a source (2) such as an electrical net, medium under pressure etc. whereas each of the machine units is provided with a cut off means (3) for the energy feed, acted upon via a receiver (5) by a transmitted signal, with a radio frequency, from a transmitter in a group of mobile units (7), provided with such, carried by one or several operators characterised in that every machine unit (1) is provided with a communication unit (4) comprising an transmitter/receiver (5) for radio-resp. IR-frequency in contact with a computer unit (6) and each mobile unit (7) is provided with a transmitter/receiver for a radio-resp. IR-frequency for identifying and authorizing communication, whereas the cut off means (3) is provided not to be activated or inactivated without foregoing identifying and authorizing IR-communication.

2. An emergency stop system according to claim 1, characterised in that the communication unit (4) is provided to continually warrant the radio communication with the identifying and authorizing mobile unit, whereas it is provided to emit alarm (12), preferably optically or acoustically when the communication is interrupted.

3. An emergency stop system according to claim 1 or 2, characterised in that the mobile unit (7) is provided with a display, arranged to show the status for the communication with the communication unit (4).

4. An emergency stop system for a machine unit (1), driven by energy from a source (2) such as an electric net, medium under pressure etc, whereas the machine unit is provided with a cut off means (3) for the energy feed, acted upon via a receiver (5) by a transmittal signal, with a radio frequency, from a transmitter in a group of mobile units (7), provided with such, carried by one or several operators, characterised in that the machine unit (1) is provided with a communication unit (4) comprising a transmitter/receiver (5) for radio-resp. IR-frequency in contact with a computer unit (6) and each mobile unit (7) is provided with a transmitter/receiver for radio-resp. IR-frequency for identifying and authorizing communication, whereas the cut off means (3) is provided not to be activated or inactivated without foregoing identifying and authorising radio- or IR-communication.

5. An emergency stop system according to claim 4, characterised in that the communication unit (4) is provided to continually warrant the radio communication with the identifying and authorising mobile unit, whereas it is provided to emit alarm (12), preferably optically or acoustically when the communication is interrupted.

6. An emergency stop system according to claim 5, characterised in that the mobile unit (7) is provided with a display, arranged to show the status for the communication with the communications unit (4).

* * * * *